United States Patent [19]
Adams et al.

[11] 3,915,553
[45] Oct. 28, 1975

[54] ELECTROOPTIC COLOR FILTER SYSTEM

[75] Inventors: James E. Adams, Ontario; Werner E. L. Haas, Webster, both of N.Y.

[73] Assignee: Xerox Corporation, Stamford, Conn.

[22] Filed: Dec. 20, 1973

[21] Appl. No.: 426,844

[52] U.S. Cl. ............ 350/150; 350/158; 350/160 LC
[51] Int. Cl.² ............................................. G02F 1/26
[58] Field of Search ........... 350/147, 148, 157, 158, 350/160 LC

[56] References Cited
UNITED STATES PATENTS

| | | | |
|---|---|---|---|
| 3,501,219 | 3/1970 | Caulfield | 350/158 |
| 3,661,442 | 5/1972 | Kumada | 350/157 |
| 3,669,525 | 6/1972 | Adams et al | 350/158 |

Primary Examiner—Alfred E. Smith
Assistant Examiner—Michael J. Tokar
Attorney, Agent, or Firm—James J. Ralabate; David C. Petre; Gaetano D. Maccarone

[57] ABSTRACT

An electrooptic color filter system which is capable of removing all but one color band from a two or three color band light source and is operable at very high frequencies, e.g., microwave. The system exploits the optical activity characteristics of optically active materials such as solid single crystals, liquids and optically negative liquid crystal materials in combination with the properties of electrooptic light rotators and linear analyzers.

18 Claims, 4 Drawing Figures

3,915,553

ELECTROOPTIC COLOR FILTER SYSTEM

BACKGROUND OF THE INVENTION

This invention relates to an electrooptic color filter system and, more particularly, to such a system which exploits the optical activity properties of optically active materials.

With the rapid advance in light beam scanning techniques (e.g., electrooptic, high speed mirrors, acoustooptic), various applications such as displays, memories, facsimile, composition, etc., are now practical. Desirably, such devices should include color capability. Devices capable of electrooptically selecting a color or band of colors from a multiple band or continuous source have been disclosed in the prior art for use in various applications such as, for example, with color television reproduction devices. See, for example, U.S. Pat. Nos. 2,493,200; 2,586,635; 2,715,153; 2,753,763 and 2,834,254. Nevertheless, with the growth of technology, there is often discovered new means for providing results which can be obtained with prior art techniques. The present invention relates to a novel and advantageous electro-optic color filter system which utilizes optically active materials.

SUMMARY OF THE INVENTION

It is, therefore, an object of this invention to provide an electrooptic color filter system.

It is another object of the invention to provide an electrooptic color filter system which exploits the optical activity characteristics of optically active materials.

It is another object of the invention to provide a liquid crystal electrooptic color filter system.

It is a further object of the invention to provide an electrooptic color filter system which utilizes optically negative liquid crystal films.

Still further, it is an object of the invention to provide an electrooptic color filter system which utilizes optically active solid single crystals.

It is still another object of the invention to provide an electrooptic color filter system which is capable of removing two color bands from a three color band source.

Yet another object of the invention is to provide an electrooptic color filter system which is capable of removing one color band from a two color band source.

BRIEF SUMMARY OF THE INVENTION

The foregoing and other objects and advantages are accomplished in accordance with the present invention by directing a linearly polarized optical signal upon an optically active element which is adapted to rotate the plane of polarization of different wavelengths within the signal by different predetermined amounts, passing the resultant emergent beam through an electrooptic light rotator which is capable of rotating the plane of polarization of the different wavelengths in the beam by an equal amount and arranging in the path of the emergent light beam a linear analyzer having its acceptance plane oriented in a predetermined direction. According to a preferred embodiment, the color filter system of the invention includes two optically active elements, two electrooptic light rotators and two linear analyzers.

BRIEF DESCRIPTION OF THE DRAWINGS

For a better understanding of the invention as well as other objects and further features thereof, reference is made to the following detailed description of various preferred embodiments thereof, taken in conjunction with the accompanying drawings wherein.

DESCRIPTION OF THE PREFERRED EMBODIMENTS

Figure 1:
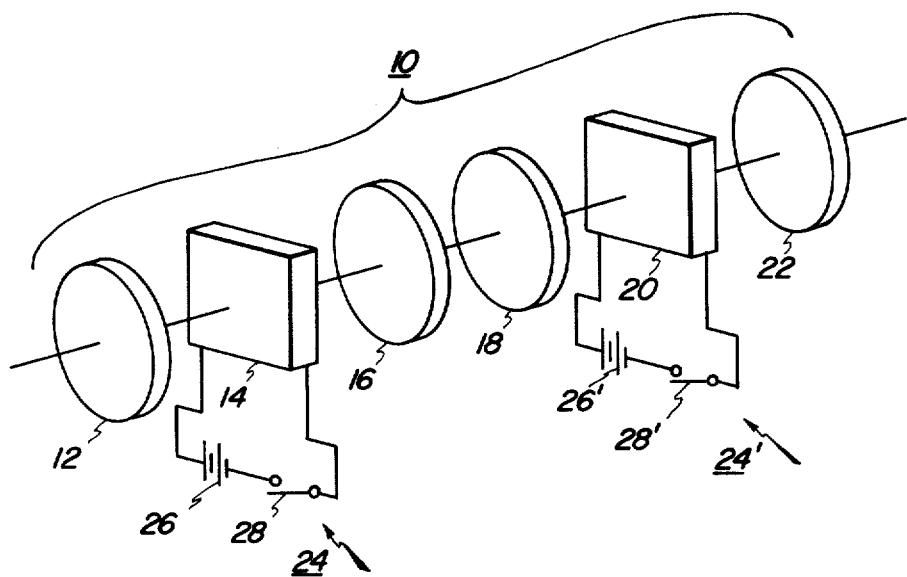
FIG. 1 is an exploded isometric view of an embodiment of an electrooptic color filter of the invention.

In FIG. 1 there is shown in exploded isometric view an embodiment of an electrooptic color filter, generally designated 10, according to the invention which comprises a first optically active element 12, a first electrooptic light rotator 14, a first linear analyzer element 16, a second optically active element 18, a second electrooptic light rotator 20 and a second linear analyzer element 22. The first and second electrooptic light rotators are shown for purposes of illustration as being connected to opposite ends of electrical circuits 24 and 24', respectively, which include power sources 26 and 26' and switches 28 and 28', respectively. It should be noted that both light rotators could be connected to the same electrical circuit with a suitable switching network adapted to energize either one or both of the rotators as desired. Power sources 26 and 26' typically are D.C. The color filter illustrated in FIG. 1 may also include an optional linear polarizer element (not shown) positioned in front of optically active element 12.

The spatial relationship between the elements of color filter 10 is for the purposes of illustration. It should be noted that the individual elements could be in contact with each other where it is so desired. This latter embodiment is preferred since light reflections and contamination by foreign matter are eliminated.

Optically active elements 12 and 18 may comprise any suitable optically active material such as optically negative liquid crystalline substances, optically active liquids and optically active solid single crystals. In a preferred embodiment of the invention, optically active elements 12 and 18 comprise suitable optically negative liquid crystalline materials. Birefringence also referred to as double refraction, is an optical phenomenon characteristic of many solid crystals and all liquid crystal substances. When a beam of unpolarized light strikes a birefringent substance, it is split into two polarized components whose transverse vibrations are at right angles to each other. The two components are transmitted with different velocities through the substance and emerge as beams of linearly polarized light. By the term "optically negative liquid crystalline materials," as used herein, is meant those for which the extraordinary index of refraction $nE$ is smaller than the ordinary index of refraction $n_o$. Cholesteric liquid crystal substances exhibit this property. For a detailed description of this phenomenon, see Optical Crystallography, Wahlstrom, 4th Edition, Wiley and Sons, Inc., New York.

Typical suitable cholesteric liquid crystalline materials include derivatives from reactions of cholesterol and inorganic acids, for example: cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate, cholesteryl hexanoate; cholesteryl formate; cholesteryl propionate, cholesteryl acetate; cholesteryl valerate; cholesteryl vaccenate; cholesteryl oleate; cholesteryl erucate; cholesteryl butyrate; cholesteryl caproate; cholesteryl laurate; cholesteryl myristate; cholesteryl clupanodonate; ethers of cholesterol, such as cholesteryl decyl ether; cholesteryl lauryl ether; cholesteryl oleyl ether; cholesteryl dodecyl ether, carbamates and carbonates of cholesterol, such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl-p-nonylphenyl carbonate; cholesteryl-2-2-ethoxyethoxy) ethyl carbonate; cholesteryl-2-(butoxyethoxy) ethyl carbonate; cholesteryl-1-2(2-methoxyethoxy) ethyl carbonate; cholesteryl geranyl carbonate; cholesteryl heptyl carbamate; and alkyl amides and aliphatic secondary amines derived from $3\beta$-amion$\Delta5$-cholestene and mixtures thereof; peptides such as poly-$\gamma$-benzyl-$l$-glutamate; derivatives of beta sitosterol, such as sitosteryl chloride; and amyl ester of cyano benzylidene amino cinnamate. The alkyl groups in said compounds are typically saturated or unsaturated fatty acids, or alcohols, having less than about 25 carbon atoms, and unsaturated chains of less than about 5 double-bonded olefinic groups. Aryl groups in the above compounds typically comprise simply substituted benzene ring compounds. Any of the above compounds and mixtures thereof may be suitable for cholesteric liquid crystalline materials in the advantageous system of the present invention.

Optically active elements 12 and 18 may also comprise suitable optically negative mixtures of cholesteric and nematic liquid crystalline materials. Typical nematic liquid crystalline materials which are suitable for use include: p-azoxyanisole, p-azoxyphenetole, p-butoxybenzoic acid, p-methoxycinnamic acid, butyl-p-anisylidene-p'aminocinnamate, anisyliden-p-aminophenylacetate, p-ethoxybenzylamino-$\alpha$-methylcinnamic acid, 1,4-bis (p-ethoxybenzylidene)cyclohexanone, 4,4'-dihexyloxyazoxybenzene, 4,4'-diheptyloxazoxybenzene, anisal-p-aminoazobenzene, anisaldazine, $\alpha$-benzeneazo-(anisal naphthylamine), anisylidene-p-n-butylaniline, p-ethoxybenzylidene-p'-n-butylaniline, stilbenes, tolanes and mixtures thereof.

Compositions suitable for use as optically active elements 12 and 18 may also comprise optically negative mixtures of cholesteric liquid crystalline materials and suitable smectic liquid crystalline substances as well as mixtures of cholesteric liquid crystalline materials and suitable non-liquid crystalline substances which are compatible with the cholesteric liquid crystal component. Typical suitable non-liquid crystalline materials include polyamides, lecithin and the like. Typical suitable smectic liquid crystalline substances include: n-propyl-4'-ethoxybiphenyl-4-carboxylate; 5-chloro-6-n-heptyloxy-2-naphthoic acid; lower temperature mesophases of cholesteryl octanoate, cholesteryl nonanoate and other open-chain aliphatic esters of cholesterol with chain length of 7 or greater, cholesteryl oleate; sitosteryl oleate; cholesteryl decanoate; cholesteryl laurate; cholesteryl myristate; cholesteryl palmitate; cholesteryl stearate; 4'-n-alkoxy-3'-nitrobiphenyl-4-carboxylic acids, ethyl-p-azoxycinnamate; ethyl-p-4-ethoxybenzylideneaminocinnamate; ethyl-p-azoxybenzoate; potassium oleate; ammonium oleate; p-n-octyloxy benzoic acid; the low temperature mesophase of 2-p-n-alkoxybenzylideneaminofluorenones with chain length of 7 or greater; the low temperature mesophase of p-(n-heptyl) oxybenzoic acid; anhydrous sodium stearate; thallium (I) stearate; mixtures thereof and others.

Optically active elements 12 and 18 may also comprise optically negative mixtures of nematic liquid crystalline materials and suitable optically active, non-mesomorphic materials which are substantially completely soluble in, or miscible with, the nematic liquid crystalline material. The non-mesomorphic, optically active material may typically comprise from about 2 to about 60 percent by weight of the composition. Of course, the amounts of the respective components in any composition suitable for use according to the advantageous color display system are controlled by the requirement that the composition should be optically negative. Typical suitable optically active, non-mesomorphic materials include: derivatives of alcohols such as $l$-menthol, $l$-linanool, d-mannitol, d-borneol and d-guercitol; derivatives of ketones such as d-camphor, d-3-methylcyclohexanone, $l$-menthone and $l$-6-isopropyl-3-cyclohexanone; derivatives of carboxylic acids such as d-citronellic acid, $l$-citronellic acid, d-chaulmoogric acid, $l$-campholic acid, $l$-arabonic acid, d-tartaric acid and $l$-ascorbic acid; derivatives of aldehydes such as d-citronellal; derivatives of alkenes such as $l$-$\beta$-pinene, d-silversterene, and d-limonene; derivatives of amines such as $l$-2-methylpiperidine; derivatives of nitriles such as d-mandelonitrile; derivatives of amides such as d-hydrocarbamide; cholesterol, derivatives of cholesterol and mixtures of the above.

It should be noted that these optically active, non-mesomorphic materials may be used in any of the optically negative liquid crystalline compositions used in the inventive color display system. For example, these materials may be combined with cholesteric liquid crystalline materials to form optically negative liquid crystalline composition suitable for use according to the invention.

Mixtures of liquid crystals can be prepared in organic solvents such as chloroform, petroleum ether and others, which are typically evaporated from the mixture leaving the liquid crystal composition. Alternatively, the individual components of the liquid crystalline mixture can be combined directly by heating the mixed components above or below the isotropic transition temperature or without heating.

The above lists of typical suitable materials are intended to encompass mixtures of the above. These lists are intended to be representative only and are not to be construed as being exhaustive or limiting the invention to the specific materials recited. Although any liquid crystalline composition having optically negative characteristics is suitable for use in the present color display system, it should be recognized that the various different substances or compositions which are suitable for use possess the requisite properties at some specific temperature range which may be at or near room temperature. Typically, the color filter system will be operated at or near room temperature and it is, therefore, preferred to use liquid crystalline compositions or substances which have a liquid crystal state at or near room temperature. It should be noted here that liquid crystal films are typically tacky, soft, viscous or liquid and therefore are preferably surrounded by a film of a protective material to protect the liquid crystalline substance from contamination with foreign matter and to maintain the film in place. The protective material may be any suitable material having the necessary mechanical properties and which is optically isotropic and transparent to the incident light as well as being nonreactive with the liquid crystalline material. Typical suitable materials for this purpose include glass and fused silica.

Electrooptic light rotators 14 and 20 may comprise any of various commercially available devices. Typical devices suitable for use for this purpose include the types commonly referred to as Pockels cells and Kerr cells which are commercially available from Isomet Corp., Palisades Park, New Jersey. Linear analyzers 16 and 22 may comprise materials such as, for example, Polaroid Sheet (commercially available from Polaroid Corp.), Glan-Thompson polarizers, Nicol prisms and the like.

In practice a linearly polarized beam of light containing at least three distinct color bands, for example, the red, green and blue primary color components of white light, is directed upon color filter 10. The light source (not shown) may be any which is capable of providing linearly polarized light either intrinsically or in combination with other elements. Typical suitable light sources include multiple wavelength lasers which intrinsically emit substantially completely linearly polarized light; light emitting luminescent films and gas discharge arcs, e.g., Xenon arcs, which should be used with some means for removing all but linearly polarized light with a preferred direction such as a linear polarizer, etc. Where a linear polarizer is employed, it could be provided in contact with optically active element 12. It is preferred to use a laser which emits the three appropriate colors as the light source because of the simplicity of the element and the quality of the light it provides.

Optically active element 12 may comprise a film of an optically negative liquid crystalline material of a thickness such that the planes of polarization of the three distinct color bands are rotated in a predetermined manner. Description of how this is accomplished involves a discussion of the optical properties of cholesteric, or optically negative, liquid crystalline materials which now follows.

The molecules in cholesteric liquid crystals are arranged in very thin layers with the long axes of the molecules parallel to each other and to the plane of the layers within each layer. Because of the asymmetry and steric nature of the molecules, the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in Molecular Structure and the Properties of Liquid Crystals, G. W. Gray, Academic Press, 1962. Cholesteric liquid crystalline materials have the property that when the propagation direction of plane polarized or unpolarized light is along the helical axis thereof, i.e., when the light enters in a direction perpendicular to the long axes of the molecules, (neglecting absorption considerations), this light is essentially unaffected in transmission through thin films of such liquid crystals except for a wavelength band centered about some wavelength $\lambda_o$ where $\lambda_o = 2np$ with $n$ representing the index of refraction of the liquid crystal substance and $p$ the pitch or repetition distance of the helical structure. The half intensity bandwidth $\Delta\lambda_o$ of this wavelength band centered about $\lambda_o$ will typically be of the order of about 1/10 to 1/30 of the center wavelength. For light of a wavelength $\lambda_o$, the cholesteric liquid crystal, under these conditions, exhibits selective reflection of the light such that approximately 50 percent of the light is reflected and approximately 50 percent is transmitted, assuming negligible absorption which is usually the case, with both the reflected and transmitted beams being approximately circularly polarized in opposite sense. For light having wavelengths around $\lambda_o$ and not at $\lambda_o$, the same effect is present but not as pronounced. The transmitted light is not circularly polarized but is instead elliptically polarized. The cholesteric liquid crystals which exhibit this property of selective reflection of light in a region centered around some wavelength $\lambda_o$ are said to be in the Grandjean, or "disturbed," texture. If $\lambda_o$ is in the visible region of the spectrum, the liquid crystalline film appears to have the color corresponding to $\lambda_o$ and, if $\lambda_o$ is outside the visible spectral region, the film appears colorless for viewing at normal incidence. Depending upon the intrinsic rotary sense of the helix, i.e., whether it is right-handed or left-handed, the light that is transmitted in the region about $\lambda_o$ is either right-hand circularly polarized light (RHCPL) or left-hand circularly polarized light (LHCPL). The transmitted light is circularly polarized with the same sense of polarization as that intrinsic to the helix. Thus, a cholesteric liquid crystalline material having an intrinsic helical structure which is left-handed in sense will transmit LHCPL and one having a helical structure which is right-handed in sense will transmit RHCPL. This property of cholesteric liquid crystals has been referred to as "reflective circular dichroism."

Cholesteric liquid crystalline materials (in the Grandjean texture state) also possess anomalously high optical activity which changes sign at the critical wavelength $\lambda_o$ described above. Thin films of cholesteric liquid crystalline materials, i.e., from about 0.5 to about 50 microns in thickness rotate the plane of polarization of linearly polarized light by substantial amounts depending upon the wavelength of the incident light, the pitch of the material and the thickness of the film. This effect is dispersive, that is, different wavelengths are rotated by different amounts, and is linear in film thickness. The relationship between rotation, film thickness and pitch is generally given by the expression $$\theta = \frac{n\pi a^2 \lambda_o{}^3}{2\lambda (\lambda_o{}^2 - \lambda^2)}$$

which is described by Hl. de Vries in Acta Crist. Vol. 4, 219 (1951). $\theta$ is rotation in radians per unit thickness of the liquid crystal film; $\alpha$ depends on the index of refraction anisotropy and is equal to $(n_o - n_E)/n$ where $n$ is the average of $n_o$ and $n_E$; $\lambda$ is the wavelength of incident light and $\lambda_o$ has been previously identified. Applicants are aware that according to the current state of the art, the equation set forth above is not considered to be completely accurate in all situations but rather may be subject to small corrections in some instances. Nevertheless, it is thought to be appropriate for the purpose of providing a complete description of the invention and aiding those skilled in the art to better understand and practice the same and is discussed herein to that end. Of course, there is no intention to limit the scope of the invention by the use of the equation.

Figure 2:
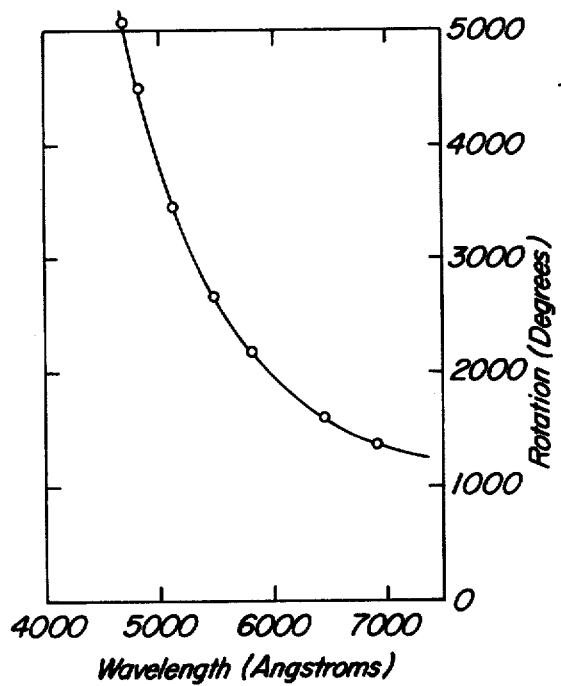
FIG. 2 is a graphical illustration showing the amount of rotation imparted to incident light by a typical optically negative liquid crystal film as a function of the wavelength of the incident light.

FIG. 2 graphically illustrates the amount of rotation imparted to incident light by a particular optically negative liquid crystalline material as a function of wavelength. Referring now to FIG. 2, there is shown the optical activity exhibited at 125°C by a 50 micron thick film of a mixture of 5 percent by weight cholesteryl benzoate and 95 percent by weight p-azoxyphenetole deposited on a glass substrate. The optically negative liquid crystalline material has a $\lambda_o$ value of 9.6 microns. This data is disclosed by R. Cano, Bull. Soc. Fr. Mineral. Cristallogr., XC, 333 (1967). Of course, the particular composition utilized to illustrate this phenomenon is intended to be for the purposes of illustration only. As noted previously, the optical activity of the liquid crystalline composition changes sign at the wavelength region around $\lambda_o$, referred to previously herein as $\Delta\lambda_o$. In the wavelength region referred to as $\Delta\lambda_o$, the incident light is not rotated but rather a portion is reflected and a portion is transmitted as was previously described. Hence, the incident light should be outside this region and, preferably, far from this region in order to obtain pure optical activity effects. For optimum performance of the color filter system of the invention, the wavelengths of the incident light should be less than $\lambda_o - 2\Delta\lambda_o$ or more than $\lambda_o + 2\Delta\lambda_o$. In practice this is relatively easy to achieve since liquid crystalline materials or compositions having $\lambda_o$ values in the ultraviolet or infrared are known.

It should be noted here that liquid crystal films having a thickness up to about 50 microns provide optimum results according to the present invention. The rotation imparted to the incident linearly polarized light is a linear function of the liquid crystal film thickness as noted previously. As the thickness of the film becomes relatively larger, e.g., above about 50 microns, there is a gradual deterioration in the quality of the emergent light, i.e., the light tends to depolarize so that other than completely linearly polarized light is included and the system suffers a corresponding loss in sharpness. It should be understood that the high dispersion of the optically active materials utilized according to the present color filter system inherently limits the bandwidth of the incident light as can be seen from FIG. 2. Generally, the acceptable bandwidth in any particular instance depends upon the dispersion of the optically active element and the degree of the color separation desired in the output beam.

From the equation set forth above, it can be seen that by proper selection of an optically negative liquid crystalline material having a particular pitch and the thickness of the film of the material, it is possible to arbitrarily select, for three wavelengths of incident light, the angles between the planes of polarization of the three wavelengths to within some constant, that is, the angle between the orientation of each wavelength can be controlled but not the absolute orientation of each wavelength in space. The operation of the present color filter system depends upon the relative orientation of each wavelength of the incident light after passing through the optically negative liquid crystal film; the absolute orientation in space of the different wavelengths is irrelevant.

As previously noted above herein, optically active elements 12 and 18 may comprise optically active solid single crystals and optically active liquids. Typical suitable solid single crystals include, for example, quartz, sodium iodate (NaIO$_4$ · 3H$_2$O), diacetyl phenolphthalein [C$_{20}$H$_{12}$O$_4$(C$_2$H$_3$O)$_2$] and sugar (C$_{12}$H$_{22}$O$_{11}$). At 20°C and for an 18 mm path length, a single crystal of quartz, cut perpendicular to the optic axis, will rotate plane polarized light traveling down the optic axis as follows:

| | WAVELENGTH (Å) | ROTATION |
|---|---|---|
| (A) | 4860 | 630° |
| (B) | 5500 | 450° |
| (C) | 6100 | 360° |

It is noted that the angle between (A) and (B) is 180° so they are parallel if the angle between (B) and (C) is 90° as desired. Typical suitable liquids include, for example, turpentine, sugar solutions such as solutions of l-glucose (B), lactose, sucrose, etc., in water, solutions of tartaric acid in water, solutions of arabinose in water, etc.

Figure 3:
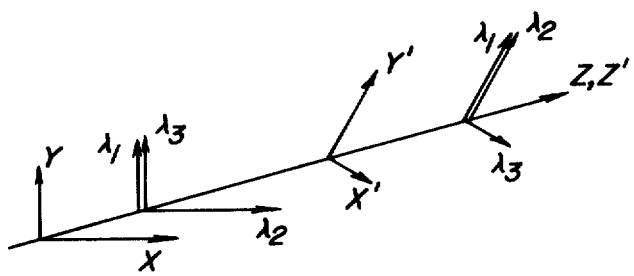
FIG. 3 is a graphical illustration showing the position of the various electric vectors of incident light at various states of its passage through the color filter shown in FIG. 1.

For the purpose of discussion, let it be assumed, as illustrated in FIG. 3, that a light source provides three color bands centered around $\lambda_1$, $\lambda_2$ and $\lambda_3$ and let the propagation direction be designated Z. Optically active element 12 is selected such that the planes of polarization of $\lambda_1$ and $\lambda_3$ emerge parallel and the plane of polarization of $\lambda_2$ is rotated by 90° with respect to them. Now let $\lambda_2$ define the X axis and $\lambda_1$ and $\lambda_3$ define the Y axis. Accordingly, this represents the relationship between the wavelengths when the incident light leaves liquid crystal film 12. The incident light then enters electrooptic light rotator 14. The rotator 14 may comprise a material in which birefringence can be changed or induced in order to control the state of polarization of incident light. This can be done, for example, by applying an electric field to the rotator in a direction perpendicular to the propagation direction of plane polarized light in the rotator. The index of refraction for light vibrating in the electric field direction will be different from that of the light vibrating perpendicular to the electric field direction. Where the plane of polarization of the incident beam makes some angle with the electric field, for example, 45°, the electric vector of the light can be resolved into a component along the electric field and one perpendicular to it. These components propagate through the material with different velocities and when the emerging components recombine they are out of phase. Generally, elliptically polarized light will result. However, for certain phase retardations, i.e., where the phase shift is $m\pi$ radians (where $m$ is any integer), the emergent light will again be plane polarized but rotated by 90°. Accordingly, electrooptic rotator 14 is oriented such that the applied electric field makes an angle of 45° with the X axis. Of course, it will be understood by those skilled in the art that other types of rotators which may be used according to the present invention require different geometries. When switch 28 is closed, an electric field is applied to electrooptic rotator 14 and the planes of polarization of $\lambda_1$, $\lambda_2$ and $\lambda_3$ are all rotated by 90°. Linear analyzer 16 is positioned with its acceptance plane along the X axis.

Optically active element 18 is selected such that the planes of polarization of $\lambda_1$ and $\lambda_2$ emerge parallel and at right angles to the plane of polarization of $\lambda_3$. Consider now a second coordinate system (X', Y', Z') such that Z' = Z and X' is defined by $\lambda_3$ after passing optically active element 18. Electrooptic rotator 20 is oriented such that the electric field applied thereto is at 45° to X' and linear analyzer 22 is positioned with its acceptance angle along X'. In operation of color filter 10, there are four possible results available and it is only necessary to make two binary decisions to achieve the desired result. Where an electric field is applied to rotator 14 and a field is also applied to rotator 20, $\lambda_2$ is extinguished by linear analyzer 16, $\lambda_3$ is extinguished by linear analyzer 22 and $\lambda_1$ is transmitted. To transmit $\lambda_2$, rotator 14 is not energized and an electric field is applied to rotator 20 which results in both $\lambda_1$ and $\lambda_3$ being extinguished by linear analyzer 16 and $\lambda_2$ being rotated into the acceptance plane of analyzer 22. When an electric field is applied to rotator 14 and rotator 20 is not energized, $\lambda_2$ is extinguished by linear analyzer 16, $\lambda_1$ is extinguished by linear analyzer 22 and $\lambda_3$ is transmitted. Where neither rotator is energized, both $\lambda_1$ and $\lambda_3$ are extinguished by linear analyzer 16 and $\lambda_2$ is extinguished by linear analyzer 22 so that no light is allowed to pass through the device.

Since state of the art electrooptic light rotators are capable of switching at very high frequencies, e.g., microwave, the color filter system of the invention may be advantageously utilized to provide color capability in various applications and particularly those in which laser scanning is used such as, for example, displays, memories, facsimile and the like. Because of the extremely rapid on-off switching required, power sources 26 and 26' are high frequency, high voltage D.C. sources.

Figure 4:
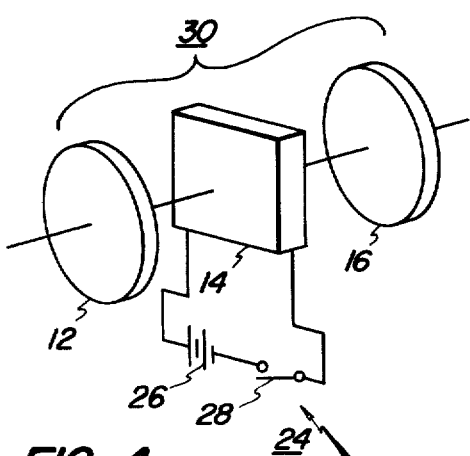
FIG. 4 is an exploded isometric view of another embodiment of an electrooptic color filter of the invention.

FIG. 4 illustrates another embodiment of a color filter according to the invention which is capable of eliminating one of two color bands from a two color band source. The elements of the device illustrated in FIG. 4 are similar to those of the device shown in FIG. 1 and are designated by identical numerals. Referring now to FIG. 4, there is seen in exploded isometric view the color filter, designated 30, comprising optically active element 12, electrooptic light rotator 14 and linear analyzer 16. According to this embodiment, linearly polarized light containing two color bands centered about $\lambda_A$ and $\lambda_B$, respectively, is directed upon optically active element 12 which is selected so that the relative rotation between the planes of polarization of the wavelength bands in the emergent beam is 90°. As described above, the electrooptic light rotator 14 is placed in the beam such that the applied electric field makes an angle of about 45° with the plane of polarization of $\lambda_B$ after emerging from liquid crystal film 12. Again, the voltage is adjusted to produce one-half wave retardation (the rotator being chosen with low dispersion such that the same voltage produces approximately one-half wave shift for both $\lambda_A$ and $\lambda_B$) and linear analyzer 16 has its acceptance plane positioned parallel to the plane of polarization of $\lambda_A$ after emerging from liquid crystal film 12. Consequently, when the field is applied to rotator 14 by closing switch 28, both $\lambda_A$ and $\lambda_B$ are rotated by 90° and $\lambda_A$ is extinguished with $\lambda_B$ being transmitted. When no field is applied to the rotator, $\lambda_A$ is transmitted and $\lambda_B$ is extinguished by the linear analyzer. Because of the $\cos^2 \theta$ factor in extinction, neither the optically active element nor the rotator has to be critically adjusted in order to obtain good color separation.

Although specific device configurations and materials have been described in the description of the preferred embodiments, it will be understood that the invention is not limited thereto but rather that modifications and variations will occur to those skilled in the art which are within the spirit of the invention and the scope of the claims.

What is claimed is:

1. In combination, an electrooptic color filter and electrical means coupled thereto to cause the filter to transmit one of three color components of a three color component light signal depending upon the energizing signals from said electrical means and to allow said color filter to extinguish all color components of the light signal in the absence of any energizing signals from said electrical means, said color filter comprising the following elements arranged along an optic axis a first optically active element capable of rotating the plane of polarization of different wavelengths of light by predetermined amounts;

a first electrooptic light rotator capable of rotating the plane of polarization of different wavelengths of light by an equal amount coupled to said electrical means;

a first linear analyzer having its acceptance plane oriented in a predetermined direction;

a second optically active element capable of rotating the plane of polarization of different wavelengths of light by predetermined amounts;

a second electrooptic light rotator capable of rotating the plane of polarization of different wavelengths of light by an equal amount coupled to said electrical means; and a second linear analyzer having its acceptance plane oriented in a predetermined direction.

2. The color filter as defined in claim 1 wherein at least one of said first and second optically active elements comprises a layer of an optically negative liquid crystalline material.

3. The color filter as defined in claim 2 wherein said layer of optically negative liquid crystalline material has a thickness of up to about 50 mils.

4. The color filter as defined in claim 3 wherein said optically negative liquid crystalline material comprises cholesteric liquid crystalline material.

5. The color filter as defined in claim 3 wherein said optically negative liquid crystalline material comprises a mixture of cholesteric liquid crystalline material and nematic liquid crystalline material.

6. The color filter as defined in claim 3 wherein said optically negative liquid crystalline material comprises a mixture of optically active non-mesomorphic material and nematic liquid crystalline material.

7. The color filter as defined in claim 1 and further including a linear polarizer positioned in front of said first optically active element.

8. The color filter as defined in claim 1 wherein at least one of said first and second optically active elements comprises an optically active solid single crystal.

9. The color filter as defined in claim 1 wherein at least one of said first and second optically active elements comprises an optically active liquid.

10. In combination, an electrooptic color filter and electrical means coupled thereto to cause the filter to transmit one of two color components of a two color component light signal when an energizing signal is provided by said electrical means and to transmit the other color component of the light signal in the absence of any energizing signal from said electrical means, said filter comprising the following elements arranged along an optic axis an optically active element capable of rotating the plane of polarization of different wavelengths of light by predetermined amounts;

an electrooptic light rotator capable of rotating the plane of polarization of different wavelengths of light by an equal amount coupled to said electrical means; and a linear analyzer having its acceptance plane oriented in a predetermined direction.

11. The color filter as defined in claim 10 wherein said optically active element comprises a layer of an optically negative liquid crystalline material.

12. The color filter as defined in claim 11 wherein said layer of optically negative liquid crystalline material has a thickness of up to about 50 mils.

13. The color filter as defined in claim 12 wherein said optically negative liquid crystalline material comprises cholesteric liquid crystalline material.

14. The color filter as defined in claim 12 wherein said optically negative liquid crystalline material comprises a mixture of cholesteric liquid crystalline material and nematic liquid crystalline material.

15. The color filter as defined in claim 12 wherein said optically negative liquid crystalline material comprises a mixture of optically active non-mesomorphic material and nematic liquid crystalline material.

16. The color filter as defined in claim 10 and further including a linear polarizer positioned in front of said optically active element.

17. The color filter as defined in claim 10 wherein said optically active element comprises an optically active solid single crystal.

18. The color filter as defined in claim 10 wherein said optically active element comprises an optically active liquid.

* * * * *

UNITED STATES PATENT OFFICE
CERTIFICATE OF CORRECTION

Patent No. 3,915,553            Dated October 28, 1975

Inventor(s) James E. Adams et al.

It is certified that error appears in the above-identified patent and that said Letters Patent are hereby corrected as shown below:

Columns 5 through 8 as shown on the attached sheet should be added, but will apply to the grant only.

Signed and Sealed this third Day of February 1976

[SEAL]

Attest:

RUTH C. MASON
*Attesting Officer*

C. MARSHALL DANN
*Commissioner of Patents and Trademarks* perature. Typically, the color filter system will be operated at or near room temperature and it is, therefore, preferred to use liquid crystalline compositions or substances which have a liquid crystal state at or near room temperature. It should be noted here that liquid crystal films are typically tacky, soft, viscous or liquid and therefore are preferably surrounded by a film of a protective material to protect the liquid crystalline substance from contamination with foreign matter and to maintain the film in place. The protective material may be any suitable material having the necessary mechanical properties and which is optically isotropic and transparent to the incident light as well as being nonreactive with the liquid crystalline material. Typical suitable materials for this purpose include glass and fused silica.

Electrooptic light rotators 14 and 20 may comprise any of various commercially available devices. Typical devices suitable for use for this purpose include the types commonly referred to as Pockels cells and Kerr cells which are commercially available from Isomet Corp., Palisades Park, New Jersey. Linear analyzers 16 and 22 may comprise materials such as, for example, Polaroid Sheet (commercially available from Polaroid Corp.), Glan-Thompson polarizers, Nicol prisms and the like.

In practice a linearly polarized beam of light containing at least three distinct color bands, for example, the red, green and blue primary color components of white light, is directed upon color filter 10. The light source (not shown) may be any which is capable of providing linearly polarized light either intrinsically or in combination with other elements. Typical suitable light sources include multiple wavelength lasers which intrinsically emit substantially completely linearly polarized light; light emitting luminescent films and gas discharge arcs, e.g., Xenon arcs, which should be used with some means for removing all but linearly polarized light with a preferred direction such as a linear polarizer, etc. Where a linear polarizer is employed, it could be provided in contact with optically active element 12. It is preferred to use a laser which emits the three appropriate colors as the light source because of the simplicity of the element and the quality of the light it provides.

Optically active element 12 may comprise a film of an optically negative liquid crystalline material of a thickness such that the planes of polarization of the three distinct color bands are rotated in a predetermined manner. Description of how this is accomplished involves a discussion of the optical properties of cholesteric, or optically negative, liquid crystalline materials which now follows.

The molecules in cholesteric liquid crystals are arranged in very thin layers with the long axes of the molecules parallel to each other and to the plane of the layers within each layer. Because of the asymmetry and steric nature of the molecules, the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in Molecular Structure and the Properties of Liquid Crystals, G. W. Gray, Academic Press, 1962. Cholesteric liquid crystalline materials have the property that when the propagation direction of plane polarized or unpolarized light is along the helical axis thereof, i.e., when the light enters in a direction perpendicular to the long axes of the molecules, (neglecting absorption considerations), this light is essentially unaffected in transmission through thin films of such liquid crystals except for a wavelength band centered about some wavelength $\lambda_o$ where $\lambda_o = 2np$ with $n$ representing the index of refraction of the liquid crystal substance and $p$ the pitch or repetition distance of the helical structure. The half intensity bandwidth $\Delta\lambda_o$ of this wavelength band centered about $\lambda_o$ will typically be of the order of about 1/10 to 1/30 of the center wavelength. For light of a wavelength $\lambda_o$, the cholesteric liquid crystal, under these conditions, exhibits selective reflection of the light such that approximately 50 percent of the light is reflected and approximately 50 percent is transmitted, assuming negligible absorption which is usually the case, with both the reflected and transmitted beams being approximately circularly polarized in opposite sense. For light having wavelengths around $\lambda_o$ and not at $\lambda_o$, the same effect is present but not as pronounced. The transmitted light is not circularly polarized but is instead elliptically polarized. The cholesteric liquid crystals which exhibit this property of selective reflection of light in a region centered around some wavelength $\lambda_o$ are said to be in the Grandjean, or "disturbed," texture. If $\lambda_o$ is in the visible region of the spectrum, the liquid crystalline film appears to have the color corresponding to $\lambda_o$ and, if $\lambda_o$ is outside the visible spectral region, the film appears colorless for viewing at normal incidence. Depending upon the intrinsic rotary sense of the helix, i.e., whether it is right-handed or left-handed, the light that is transmitted in the region about $\lambda_o$ is either right-hand circularly polarized light (RHCPL) or left-hand circularly polarized light (LHCPL). The transmitted light is circularly polarized with the same sense of polarization as that intrinsic to the helix. Thus, a cholesteric liquid crystalline material having an intrinsic helical structure which is left-handed in sense will transmit LHCPL and one having a helical structure which is right-handed in sense will transmit RHCPL. This property of cholesteric liquid crystals has been referred to as "reflective circular dichroism."

Cholesteric liquid crystalline materials (in the Grandjean texture state) also possess anomalously high optical activity which changes sign at the critical wavelength $\lambda_o$ described above. Thin films of cholesteric liquid crystalline materials, i.e., from about 0.5 to about 50 microns in thickness rotate the plane of polarization of linearly polarized light by substantial amounts depending upon the wavelength of the incident light, the pitch of the material and the thickness of the film. This effect is dispersive, that is, different wavelengths are rotated by different amounts, and is linear in film thickness. The relationship between rotation, film thickness and pitch is generally given by the expression $$\theta = \frac{n\pi\alpha^2 \lambda_o^3}{2\lambda(\lambda_o^2 - \lambda^2)}$$

which is described by Hl. de Vries in Acta Crist. Vol. 4, 219 (1951). $\theta$ is rotation in radians per unit thickness of the liquid crystal film; $\alpha$ depends on the index of refraction anisotropy and is equal to $(n_o - n_E)/n$ where $n$ is the average of $n_o$ and $n_E$; $\lambda$ is the wavelength of incident light and $\lambda_o$ has been previously identified. Applicants are aware that according to the current state of the art, the equation set forth above is not considered to be completely accurate in all situations but rather may be subject to small corrections in some instances. Nevertheless, it is thought to be appropriate for the purpose of providing a complete description of the invention and aiding those skilled in the art to better understand and practice the same and is discussed herein to that end. Of course, there is no intention to limit the scope of the invention by the use of the equation.

FIG. 2 graphically illustrates the amount of rotation imparted to incident light by a particular optically negative liquid crystalline material as a function of wavelength. Referring now to FIG. 2, there is shown the optical activity exhibited at 125°C by a 50 micron thick film of a mixture of 5 percent by weight cholesteryl benzoate and 95 percent by weight p-azoxyphenetole deposited on a glass substrate. The optically negative liquid crystalline material has a $\lambda_o$ value of 9.6 microns. This data is disclosed by R. Cano, Bull. Soc. Fr. Mineral. Cristallogr., XC, 333 (1967). Of course, the particular composition utilized to illustrate this phenomenon is intended to be for the purposes of illustration only. As noted previously, the optical activity of the liquid crystalline composition changes sign at the wavelength region around $\lambda_o$, referred to previously herein as $\Delta\lambda_o$. In the wavelength region referred to as $\Delta\lambda_o$, the incident light is not rotated but rather a portion is reflected and a portion is transmitted as was previously described. Hence, the incident light should be outside this region and, preferably, far from this region in order to obtain pure optical activity effects. For optimum performance of the color filter system of the invention, the wavelengths of the incident light should be less than $\lambda_o - 2\Delta\lambda_o$ or more than $\lambda_o + 2\Delta\lambda_o$. In practice this is relatively easy to achieve since liquid crystalline materials or compositions having $\lambda_o$ values in the ultraviolet or infrared are known.

It should be noted here that liquid crystal films having a thickness up to about 50 microns provide optimum results according to the present invention. The rotation imparted to the incident linearly polarized light is a linear function of the liquid crystal film thickness as noted previously. As the thickness of the film becomes relatively larger, e.g., above about 50 microns, there is a gradual deterioration in the quality of the emergent light, i.e., the light tends to depolarize so that other than completely linearly polarized light is included and the system suffers a corresponding loss in sharpness. It should be understood that the high dispersion of the optically active materials utilized according to the present color filter system inherently limits the bandwidth of the incident light as can be seen from FIG. 2. Generally, the acceptable bandwidth in any particular instance depends upon the dispersion of the optically active element and the degree of the color separation desired in the output beam.

From the equation set forth above, it can be seen that by proper selection of an optically negative liquid crystalline material having a particular pitch and the thickness of the film of the material, it is possible to arbitrarily select, for three wavelengths of incident light, the angles between the planes of polarization of the three wavelengths to within some constant, that is, the angle between the orientation of each wavelength can be controlled but not the absolute orientation of each wavelength in space. The operation of the present color filter system depends upon the relative orientation of each wavelength of the incident light after passing through the optically negative liquid crystal film; the absolute orientation in space of the different wavelengths is irrelevant.

As previously noted above herein, optically active elements 12 and 18 may comprise optically active solid single crystals and optically active liquids. Typical suitable solid single crystals include, for example, quartz, sodium iodate ($NaIO_4 \cdot 3H_2O$), diacetyl phenolphthalein [$C_{20}H_{12}O_4(C_2H_3O)_2$] and sugar ($C_{12}H_{22}O_{11}$). At 20°C and for an 18 mm path length, a single crystal of quartz, cut perpendicular to the optic axis, will rotate plane polarized light traveling down the optic axis as follows:

|     | WAVELENGTH (A) | ROTATION |
|-----|----------------|----------|
| (A) | 4860           | 630°     |
| (B) | 5500           | 450°     |
| (C) | 6100           | 360°     |

It is noted that the angle between (A) and (B) is 180° so they are parallel if the angle between (B) and (C) is 90° as desired. Typical suitable liquids include, for example, turpentine, sugar solutions such as solutions of 1-glucose (B), lactose, sucrose, etc., in water, solutions of tartaric acid in water, solutions of arabinose in water, etc.

For the purpose of discussion, let it be assumed, as illustrated in FIG. 3, that a light source provides three color bands centered around $\lambda_1$, $\lambda_2$ and $\lambda_3$ and let the propagation direction be designated Z. Optically active element 12 is selected such that the planes of polarization of $\lambda_1$ and $\lambda_3$ emerge parallel and the plane of polarization of $\lambda_2$ is rotated by 90° with respect to them. Now let $\lambda_2$ define the X axis and $\lambda_1$ and $\lambda_3$ define the Y axis. Accordingly, this represents the relationship between the wavelengths when the incident light leaves liquid crystal film 12. The incident light then enters electrooptic light rotator 14. The rotator 14 may comprise a material in which birefringence can be changed or induced in order to control the state of polarization of incident light. This can be done, for example, by applying an electric field to the rotator in a direction perpendicular to the propagation direction of plane polarized light in the rotator. The index of refraction for light vibrating in the electric field direction will be different from that of the light vibrating perpendicular to the electric field direction. Where the plane of polarization of the incident beam makes some angle with the electric field, for example, 45°, the electric vector of the light can be resolved into a component along the electric field and one perpendicular to it. These components propagate through the material with different velocities and when the emerging components recombine they are out of phase. Generally, elliptically polarized light will result. However, for certain phase retardations, i.e., where the phase shift is $m\pi$ radians (where $m$ is any integer), the emergent light will again be plane polarized but rotated by 90°. Accordingly, electrooptic rotator 14 is oriented such that the applied electric field makes an angle of 45° with the X axis. Of course, it will be understood by those skilled in the art that other types of rotators which may be used according to the present invention require different geometries. When switch 28 is closed, an electric field is applied to electrooptic rotator 14 and the planes of polarization of $\lambda_1$, $\lambda_2$ and $\lambda_3$ are all rotated by 90°. Linear analyzer 16 is positioned with its acceptance plane along the X axis.